US006993127B2

(12) United States Patent
Bailey

(10) Patent No.: US 6,993,127 B2
(45) Date of Patent: Jan. 31, 2006

(54) METHOD AND APPARATUS FOR GRADUAL APPLICATION OF A HITLESS MONITORING ACCESS TO A COMMUNICATIONS CIRCUIT EMPLOYING A GUIDED TRANSMISSION MEDIA

(75) Inventor: George R. Bailey, Rockville, MD (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 849 days.

(21) Appl. No.: 09/822,198

(22) Filed: Apr. 2, 2001

(65) Prior Publication Data

US 2002/0025032 A1 Feb. 28, 2002

Related U.S. Application Data

(60) Provisional application No. 60/193,359, filed on Mar. 31, 2000, provisional application No. 60/200,390, filed on Apr. 28, 2000.

(51) Int. Cl.
*H04M 1/19* (2006.01)

(52) U.S. Cl. .............................. 379/392.01; 379/29.01; 324/126; 381/94.5

(58) Field of Classification Search ............ 379/29.01, 379/35, 392.01, 394; 381/94.5; 323/238; 324/126; 710/302
See application file for complete search history.

(56) References Cited

U.S. PATENT DOCUMENTS

| 3,708,634 A * | 1/1973 | Vantill et al. ................. 379/21 |
| 4,791,659 A | 12/1988 | Ross |
| 5,329,586 A | 7/1994 | Agazzi ....................... 379/406 |
| 5,581,228 A | 12/1996 | Cadieux et al. .......... 340/146.2 |
| 5,617,450 A | 4/1997 | Kakuishi et al. ............ 375/230 |
| 5,859,906 A * | 1/1999 | Pitsch et al. ........... 379/399.01 |
| 6,181,791 B1 | 1/2001 | Murphy ...................... 379/390 |
| 6,215,856 B1 * | 4/2001 | Aponte et al. ........... 379/29.01 |

* cited by examiner

*Primary Examiner*—Daniel Swerdlow
(74) *Attorney, Agent, or Firm*—Katten Muchin Rosenman, LLP; Gilberto M. Villacorta; Andrew J. Bateman

(57) ABSTRACT

A monitor access is gradually applied an removed from a communications circuit, including a digital subscriber line (DSL), by a gradual monitor access (GMA) technique, in which a variable impedance element is gradually applied to the communications circuit until the monitor can be introduced to the communications circuit without data disruption.

12 Claims, 8 Drawing Sheets

METHOD AND APPARATUS FOR GRADUAL APPLICATION OF A HITLESS MONITORING ACCESS TO A COMMUNICATIONS CIRCUIT EMPLOYING A GUIDED TRANSMISSION MEDIA

PRIORITY

The present invention claims priority under 35 U.S.C. §119 from the provisional applications both entitled Method and System for Gradual Application of a Hitless Monitoring Access to a Communications Circuit Employing a Guided Transmission Media, filed Mar. 31, 2000 and Apr. 28, 2000, respectively, and assigned U.S. Provisional Patent Application Ser. Nos. 60/193,359 and 60/200,390, respectively, the entire applications which are herein incorporated by reference.

FIELD OF THE INVENTION

The present invention relates generally to telecommunications systems and particularly, to a method and apparatus of providing a gradual application of a monitoring access to a DSL (Digital Subscriber Loop) circuit, so that the access is completed without disrupting the ongoing transmissions. The establishment of such a circuit access without disruption, is referred to as a "hitless" access. The gradual access application of the present invention is referred to as the GMA (Gradual Monitor Access) technique.

BACKGROUND OF THE INVENTION

Public telecommunications systems include subscribers who are coupled to a telecommunications network with a twisted pair wire loop commonly known as a subscriber loop. Transmission systems based on local subscriber loops are generally called Digital Subscriber Lines (DSL). DSL signaling is used to convey digital data over existing twisted-pair copper telephone lines connecting the telephone company central office (CO) to residential subscribers, and conventional DSL data modems are designed to provide service to a certain percentage of residential customers at a prescribed data rate. In general, telephone lines employ twisted pairs of wire in order to mitigate crosstalk that can occur between tightly packed pairs carrying unrelated information streams.

An example of conventional use of DSL techniques is the Asymmetrical Digital Subscriber Line (ADSL) modulation method for the telephone loop that has been defined by standards bodies as a communications system specification that provides a low-rate data stream from the residence to the CO (upstream), and a high-rate data stream from the telephone company CO to the residence (downstream) over the same single pair. In present implementations of this modulation technique, the two directions of information flow are disjoint in the frequency domain, and consequently, it is comparatively simple to protect the receiving means at each end of the path from the collocated transmitting means.

ADSL modems are typically installed in pairs, with one of the modems installed in a home and the other in the telephone company's CO servicing that home. The pair of ADSL modems are connected to the opposite ends of the same twisted-pair and each modem can only communicate with the modem at the other end of the twisted pair. The CO will have a direct connection from its ADSL modem to the service provided (e.g., movies, Internet, etc.). An ADSL modem operates at frequencies higher than the voice-band frequencies.

Another high speed data service is known as a Symmetrical Digital Subscriber Line (SDSL), wherein, unlike an ADSL service, the information rate is intended to be equal in both the upstream and downstream directions. Currently, data speeds as high as 1.5 Mbps in each direction are common, again employing only a single pair of wires. The operating range of an SDSL circuit is, however, limited to about 10,000 feet. Further, with current SDSL techniques, the send and receive frequency spectra completely overlap. Thus, the receiver at each end must not only equalize for channel dispersion introduced by the twisted pair, but must also discriminate against the collocated transmitter signal through a process known as echo cancellation. Because of the fast data rates desired, the available bandwidth of the twisted pair must be vigorously exploited.

Modem spectral components as high as 1 MHz are commonly employed, and at these higher frequencies, path losses over 10,000 feet can be expected to be more than 70 dB (roughly one part in three thousand). Naturally then, to effectively discriminate the far end signal from the near end transmitted signal, the near end receiver echo canceller must be exquisitely adjusted. Currently, this adjustment is not only done during the SDSL modem-to-modem start-up phase, but also more gradually on a continuous basis.

Inevitably, DSL transmission through a wire twisted pair introduces distortions, and is limited by such things as loop loss, the noise environment, and modem transceiver technology. The impairments that must be tolerated increase with loop length, and bandwidth employed.

For the purposes of network maintenance and assurance of quality of service, it is necessary for the provider of network services to be able to monitor the path established between connected users at various points throughout the network. One such point is the loop connecting the serving modem to the subscriber modem. Abrupt connection of monitoring means, without disruption, to the loop, where the transmission methods are analog, is not a difficult challenge when narrow bandwidth services are transported such as Plain Old Telephone Service (POTS) or comparatively slow voice band modem service. Even well-established high speed data services such as T1, which operates at 1.544 Mbps unidirectionally on any one pair, are quite simple to monitor, or sample, at an analog point. This is a result of rudimentary encoding techniques, short distances which result in only modest signal level losses, and unidirectional transmissions.

In an attempt to increase the utilization of presently installed twisted pair loops by employing bidirectional information flow, faster data rates, and longer distances between regeneration devices, DSL services have adopted modems employing considerably more complicated encoding techniques, and massively more complicated receiving means. One negative ramification of this is that the permissible degree to which a selectively applied monitor device can alter the apparent characteristics of a transmission path, is reduced.

Extensions of conventional monitor access techniques have been successful in avoiding data flow disruptions of the currently employed variants of the ADSL services. The same enhanced techniques, however, have been disruptive to a significant percentage of SDSL circuits. Further reductions of the inevitable loading imposed as a result of the selective application of monitor circuitry to a loop would reduce the incidence of disruption, at the expense of circuit complexity, and thus, cost. Another approach which eliminates changes in loop characteristics, is to permanently attach individual monitoring, or sampling means, to each individual loop. This of course can also prove to be prohibitively bulky, complex, and thus, costly.

To understand the advantages of the present invention's gradual monitor access (GMA) technique over more conventional approaches, a very cursory comparison of the generally deployed ADSL and SDSL communication technique is provided below, particularly with regard to how transmission limitations are inherent with twisted pair media.

As stated above, the objective of a DSL service is to move data reliably at as fast a rate as possible within the limitations of the utilized twisted pair media between two locations. Two impairments which are immutably coupled to the geometry of, and materials used to build, the twisted pair, are attenuation and dispersion. Attenuation is the characteristic reduction of amplitude observed, as a result of energy loss, when a signal propagates through a twisted pair. Ultimately, if the utilized pair is allowed to become arbitrarily long, the receiver will no longer be able to distinguish between transmitted symbol states, as a result of diminished signal level relative to the inescapable thermal noise level. Thus, as stated above, there is a line length limitation.

Another consequence of using a physical medium to move data, is that a finite amount of time is consumed to allow the symbols representing the data to transfer from one end of the medium, to the other. Variability in this speed of propagation, when it is a function of signal frequency, is referred to as dispersion. Dispersion is evidenced at the receiver by symbol distortion, and the spreading over time of the effect of a particular symbol to such a degree that adjacent symbols in time are also affected. At fast symboling rates, this (Inter Symbol Interference ("ISI") can be so severe that detection of the desired symbol state by the receiver is impossible.

A third impairment, echo, for practical reasons, is also incurable. Twisted pair media nonuniformities, such as wire gauge changes, bridge taps, fabrication tolerances, imperfect terminations, and poor splices, create return reflections of propagating signals, which then appear as echoes to the sender, as well as delayed ghost signals to the receiver. Since receiver and transmitter at each end are connected together to the same twisted pair, echoes and ghosts created by progenitor symbols from either end will challenge the receiver at both ends. Because of the distributed nature of the various loop nonuniformities over the loop length, which create these partial reflections, the echoes and ghosts can arrive many symbol time intervals delayed from the progenitor symbol arrival at the intended receiver. Echoes and ghosts can thusly, create non-adjacent ISI, which further impairs the ability of the receiver to distinguish symbol states.

Both ADSL and SDSL modems mitigate attenuation through the use of gain, consistent with the receiver noise levels which of course are also magnified by the addition of gain. Both modem types use an equalizer to cancel out, or deconvolve the dispersion and ghosts. An equalizer is in essence a long ideal signal delay algorithm which has many uniformly spaced incremental adjustable weight taps, the outputs of which are summed to form the equalizer output. Through an iterative process of comparison of received symbol shape as seen at the equalizer output, and the possible ideal symbol shapes, the equalizer taps are adjusted to optimize the shape, and thus recognizability, of the exiting symbols. For later reference, present ADSL modems train the receiver equalizer once, during end to end synchronization. A modest margin of performance is reserved to accommodate small transmission characteristic shifts over time, without necessitating retraining and resynchronization.

SDSL modems on the other hand, continue to adapt to transmission characteristic shifts even after the rapid initial training interval, as long as the changes accrue slowly. Thus, in theory, the SDSL modem could avoid down time for retraining caused by transmission path characteristic shifts. In practice, however, another design choice made in the SDSL architecture, namely, to completely overlap the sending and received frequency spectrum, creates a sensitivity to transmission path variations which overshadows the presently apparent advantage.

For both ADSL and SDSL modems, one twisted pair is used for transmission in both directions. Thus, if there are any path echoes, which are inevitable, the receiver at each end must not only compensate for transmission impairments sustained by a distant end signal, but also reject adequately echoes of the collocated sender. Current ADSL modems do not overlap the sending and receiving frequency spectrums, and adequate rejection of the near end sender is possible through the use of analog and/or digital filtering to split the send and receive frequency bands.

Fortuitously, the effectiveness of this filtering is essentially independent of transmission path variations. In contrast, because SDSL modems completely overlap the send and receive spectrum, it is not possible to use frequency band splitting to immunize the receiver of interest from disruption by the associated transmitter. In order to make such as scheme work, another way to discard the near end sender signal from the gross received signal must be employed.

One such approach is to use an echo canceller, which is identical in principle to the equalizer mentioned earlier, except that the equalizer input signal is a sample of the collocated send signal, and tap weights, or coefficients, are adjusted to create an output, which is a close replica of the sender echoes contaminating the desired receive signal. When the replica is subtracted from the gross received signal, a resultant, essentially free of near end sender influence, is produced. The echo canceller coefficients are iteratively determined by comparing the known send symbols with the corrected received signal, and minimizing any correlation.

In particular, U.S. Pat. No. 5,617,450 (Kakuishi et al) disclose using an echo canceller for carrying out an echo canceling operation in a DSL interface unit, and U.S. Pat. No. 6,181,791 (Murphy) disclose reducing local echo in a communication system, particularly an ADSL. Further, U.S. Pat. No. 5,329,586 (Agazzi) disclose achieving distributed lookup table nonlinear echo cancelation with improved convergence.

The difficulty in relying principally on an echo cancellation technique, however, is that it is exquisitely sensitive to transmission path variations, particularly when the path length approaches the allowed maximum, and the disturbance to the path occurs close to one of the modems. Again, although slowly accruing changes are tolerated as a consequence of slow but continual adaptation, even tiny abrupt changes can cause loss of synchronization and subsequent retraining.

One measure of transmission path variations is to examine the value of a characteristic impedance, as a function of position along the length of the subject twisted pair. Twisted pair transmission paths used for DSL service typically display a characteristic impedance of, for example, roughly 100 ohms. Assuming the transmission path is terminated in its characteristic impedance at each end so that any energy leaving the path is totally absorbed by the terminations, and consequently no echoes are created, the apparent circuit impedance at any point along the path is one half of the characteristic impedance, or in this case, approximately 50 ohms.

Experiments conducted by the Applicant have shown that for path lengths approaching the specified maximum, for SDSL services, an abrupt change in this apparent impedance of only one part in a thousand is enough to consistently result in loss of synchronization. Conventional monitor access techniques cause small but abrupt circuit impedance changes, which consequently, cause an unacceptably high occurrence rate of synchronization failure when used randomly over the population of SDSL circuits. A design response to this difficulty is to raise the impedance of the monitor circuit to such a value, that abruptly connecting it to the subject SDSL circuit, causes less than a one part per thousand change in circuit impedance. However, practical limitations imposed by parasitic capacitance of the monitor circuit and connecting means to the subject twisted pair carrying DSL, amplifier and thermal noise levels, required bandwidth, and increased cost, are quickly reached.

Thus, there have been difficulties experienced during field trials in monitor access application while attempting to gain monitor access to certain types of DSL circuits, such as SDSL, without disruption. ISDN (Integrated Services Digital Network) modems also rely primarily on echo cancellation to function, and are thus, similarly sensitive to abrupt path characteristic changes, although to a lesser degree than the essentially similar SDSL modems, as a result of much lower rate and bandwidth requirements. As stated above, abrupt changes in media parameters, for this type of data communications equipment, cause unacceptable information rate or accuracy impairments, an in some cases, cessation of information flow.

However, in order to ensure quality of service, it is often necessary to unobtrusively monitor the progress of communications over the transmission media by connection to the media itself. Unless the monitor facility is permanently in place, the introduction or removal of the monitor, to some degree, disturbs the transmission parameters of the media. In order to minimize disruption of information flow, the loading of the monitor device should be reduced as much a possible, to the point that it can be abruptly applied without harm. However, practical limits prevent the economic realization of a shared monitor with sufficiently large bandwidth and low internal noise, simultaneously with sufficiently slight loading, to consistently permit abrupt application upon, or removal from all presently employed conventional circuits. A monitor device that would otherwise be unacceptable when abruptly applied, can be made to connect and disconnect without disruption if the ultimate loading is applied and removed in a sufficiently slow manner.

Further, although monitor access can be performed in conventional telephone data transmission systems, as disclosed in U.S. Pat. No. 5,581,228 (Cadieux et al), it has been difficult to obtain, without disruption, in DSL's.

For example, to obtain a sample of the voltage waveform appearing between the tip and ring lead of the selected loop, at the point of access, without affecting any of the twisted pair transmission characteristics, or disruption of ongoing communications, an infinite input impedance buffer amplifier can be employed with accompanying means to select and connect to the target loop, of vanishingly small physical dimensions. Alternatively, a less than ideal voltage monitor device could be permanently attached to each loop which could be potentially selected. Obviously, neither case is practical.

In contrast, a directional coupler can also be used as a sampling device, with the added benefit that the energy contribution of each modem can be sampled and substantially separated. This directivity is a predictable consequence of the characteristics of transmission lines which have been intentionally coupled by placement in close proximity to one another, over a length significant relative to the wavelength of the lowest frequency of interest. However, for the frequency band of immediate interest, which is roughly 30 kHz to 1 MHz, the dimensions of a true coupled line directional coupler would be ponderous. Thus, an approximation which would be more compact is desired. As one of ordinary skill in the art would recognize, such an approximation can be constructed using lumped circuit elements, within any arbitrary accuracy over a given bandwidth, as a function of how finely the constituent inductive and capacitive elements are divided. This approach however, also poses practical difficulties. Specifically, a lumped element directional coupler involves many more parts than a simple bridging monitor, some of which (the inductors or transformers), must be introduced in series with the tip and ring leads, not simply tapped to them. The abrupt insertion or removal of such a coupler will create severe data circuit disruptions.

One way around this is to introduce a directional coupler into each pair of interest on a permanent basis, however, such a solution would result in unacceptable equipment volumes and cost. Thus, several practical matters make the application of a conventional directional coupler prohibitive for the purpose at hand.

Therefore, the Applicant has determined that what is needed is a way to slowly apply and remove the coupling. One approach is to mechanically move the coupling transmission line section from a distance, to within close proximity of the data circuit pair to be examined. However, the implementation of this approach, is quite impractical at frequencies below roughly 1 Megahertz (i.e., wavelengths exceeding 200 meters in the twisted pair), within which all of the modems, considered thus far, operate.

A mechanical means of gradually applying a lumped directional coupler is imaginable, but extremely intricate, wherein the inductive elements could have cores with openings which would allow the slow and separate introduction of the subject tip and ring leads, and the required capacitive elements could be achieved between approaching conductive structures of sufficient area.

SUMMARY OF THE INVENTION

It is an object of the present invention to address the problem of unobtrusively monitoring the progress of communications over the transmission media employed, by selective direct connection to the media itself (i.e., perform a hitless access).

The present invention discloses a novel technique, called the gradual monitor access (GMA) technique, which takes advantage of the slow but continual adaptation of equalizer and echo canceller coefficients required to implement practical band overlapped modems. Using this technique, any monitor circuit which permits modem initialization and training when connected, can be applied or removed at will after synchronization, without disruption of service. The specific application implemented adapts a monitor circuit which was acceptable for abrupt application to an ADSL circuit, but yet created intolerable problems at application, or removal, from an SDSL circuit, to now operate benignly on the same SDSL circuits.

In particular, the method of applying a monitor access to a communications circuit, in this case a DSL, uses a variety of apparatuses to implement the objective, such as using a variable impedance element including at least one of a variable resistance element, a variable inductance element, a variable capacitance element, and a variable mutual coupling transformer. The variable element can also include adjustment means actuated by an electrical signal, an acoustic signal, light, or a mechanical actuating apparatus. For instance, if the variable element is a variable resistor, a field effect transistor (FET), a photoresistor, a strain gauge, a mechanical actuator, or a magneto resistive element can be used. Thus, the important feature is the GMA technique, and the apparatus and its control, can vary.

In the first embodiment, a variable photoresistor, a relay, and a resistor circuit which is connected to a monitor amplifier, are used. In the first embodiment, a relay and resistor circuit which connects a monitor to the communications circuit, is opened, such that no bridging loading of the circuit is presented; then a variable photoresistor is gradually illuminated and a predetermined load is applied, when a minimum resistance is reached with the photoresistor approximating a short; then the relay is closed such that the monitor circuit is now connected, but across the essential short of the photoresistor. Thus, the addition of the monitor circuit in this GMA state, does not further increase the loading beyond the predetermined value. Next, the illumination of the photoresistor is gradually removed until the monitor is connected to the communications circuit without disturbance. The removal of the monitor is accomplished in the reverse manner by slowly dropping the photoresistance to a minimum, opening the relay to disconnect the monitor circuit, and then slowly raising the photoresistance to a maximum.

In a second embodiment of the present invention, the variable element is a pair of photoresistors. The pair of photoresistors are illuminated slowly causing the load of the buffer amplifier in combination with the fixed value resistors to be applied gradually to the telecommunications circuit. The removal of the monitoring facility, and the associated load, is accomplished by reversing the process by gradually removing the illumination of the photoresistors. In this manner, the monitoring means can be applied or removed without disruption to data flow over the selected circuit.

In a third embodiment of the present invention, slowly varied coupling mutual inductances are introduced into, and gradually applied coupling capacitances are introduced onto, the circuit to be monitored. A particular apparatus for providing the variable mutual inductance between the circuit to be monitored, and the sampling circuit, includes a lead from a sampled circuit, a lead from a sampling circuit, and a third lead, all of which pass through a common core of magnetic material so as to form windings of one or more turns each. Controllable amounts of current from a current source are passed through the third lead, so that at maximum current values the magnetic core material becomes saturated, thereby reducing the effective mutual inductance between the sampled and sampling circuit to zero. Conversely, when the controllable current source is adjusted to zero, thus permitting the core material to reach a high permeability state, the core and first and second winding ratios are chosen so that the required value of mutual inductance for proper directional coupler operation is achieved.

A particular apparatus for providing a gradually applied coupling capacitance is a series connection of a fixed value capacitance and a controllable, widely variable resistance element, such as a photoresistor. In the unilluminated state, the photoresistor exhibits a resistance so large as to effectively eliminate the applied capacitive effects, whereas in the fully illuminated condition, the photoresistor exhibits trivial resistance values compared with the reactive effects of the selected capacitance value for proper directional coupler operation. By changing the illumination of the photoresistor slowly from one extreme to the other, the effective capacitance is also adjusted slowly between zero and the fixed design value. In this manner, the coupling means can be applied or removed without disruption to the data flow over the selected circuit.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Additional features, details, and advantages of the invention, will become evident from the following description and the drawing, wherein.

DETAILED DESCRIPTION OF THE PREFERRED EMBODIMENTS

The present invention, discloses the novel technique of applying a gradual monitor access (GMA) to a communications circuit, in particular, a digital subscriber line (DSL), such that the monitor is connected to the communications circuit without any data disruption or data loss. This technique can be applied using a variety of apparatuses to implement the objective, such as using a variable impedance element including at least one of a variable resistance element, a variable inductance element, a variable capacitance element, and a variable mutual coupling transformer. The variable element can also include adjustment means actuated by an electrical signal, an acoustic signal, light, or a mechanical actuating apparatus. For instance, if the variable element is a variable resistor, a field effect transistor (FET), a photoresistor, a strain gauge, a mechanical actuator, or a magneto resistive element can be used. Thus, the important feature is the GMA technique, and the apparatus and its control, can vary.

Accordingly, the following are examples of elements and apparatuses which utilize the GMA technique, and are not meant to limit the invention to the elements or apparatuses disclosed in each example. One of ordinary skill in the art would recognize that the technique could be applied to a variety of elements and apparatuses without deviating from the present spirit and scope of the invention.

Figure 1:
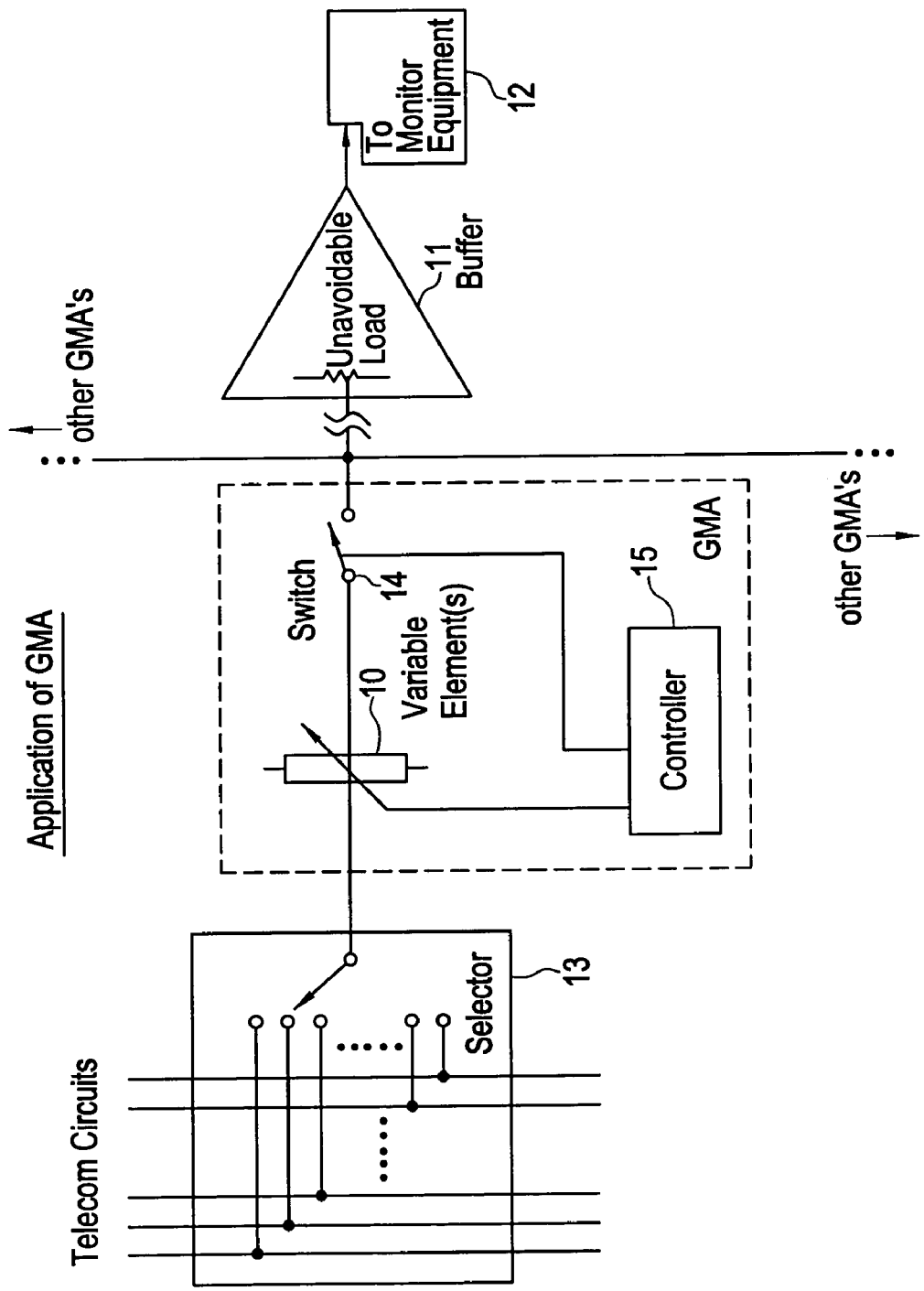
FIG. 1 illustrates, in functional block form, how GMA devices are employed between telecommunications circuit selector means and buffer amplifier means according to a first embodiment of the present invention.

In a first example which typifies a first embodiment of the present invention, the schematic diagram of FIG. 1 depicts the GMA circuit which includes a telecommunications circuit connected to a variable element which performs the GMA. In this case, the variable element is a standard light sensitive resistor 10, which is illuminated by a standard photodiode, such as a Light Emitting Diode ("LED"), as the time variable element.

The photoresistor of the first GMA embodiment belongs to a general class of monitoring devices which can be described best as two lead, or two wire, bridging monitors. Thus, by gradual application, a bridging load of a shared resource, is selectively connected, without disruption, onto a circuit utilized by modems capable of at least slow continuous adaptation to transmission path conditions, whereas the same bridging load applied abruptly to this same circuit may be disruptive.

For the classes of modems considered, the flow of information is bidirectional over the same twisted pair loop. One consequence of this is that while a two wire bridging monitor device can obtain a voltage sample of the signals impressed upon the loop by the interconnected modems, the sample is an inseparable combination of the contributions of both modems. This is acceptable, as in the present case which calls for the GMA technique, when only composite voltage, spectrum, or energy level measurement is required. Demodulation of the information flowing in either direction is, in general, impossible.

In the first embodiment as shown in FIG. 1, the switch connects the GMA to the unavoidable load of the buffer 11, which leads to the monitor equipment 12. The telecommunications circuit in this example, is a DSL.

In particular, the selector 13 shown in FIG. 1 has a convenient size of one of 24, since as a result of cabling conventions in the telecom industry, telecom circuits are generally routed in groups of 24, known as binder groups. The selector 13 is physically compact, and the variable element, such as the photoresistor 10, is located proximal to the selector 13, so that when the variable element is adjusted to remove all the loading effects of the circuitry associated with the buffer 11, the selector 13 may be operated without influence on any of the telecommunications circuits. In other words, regardless of the selector setting there is no loading or influence, upon the telecommunications circuits.

Figure 2:
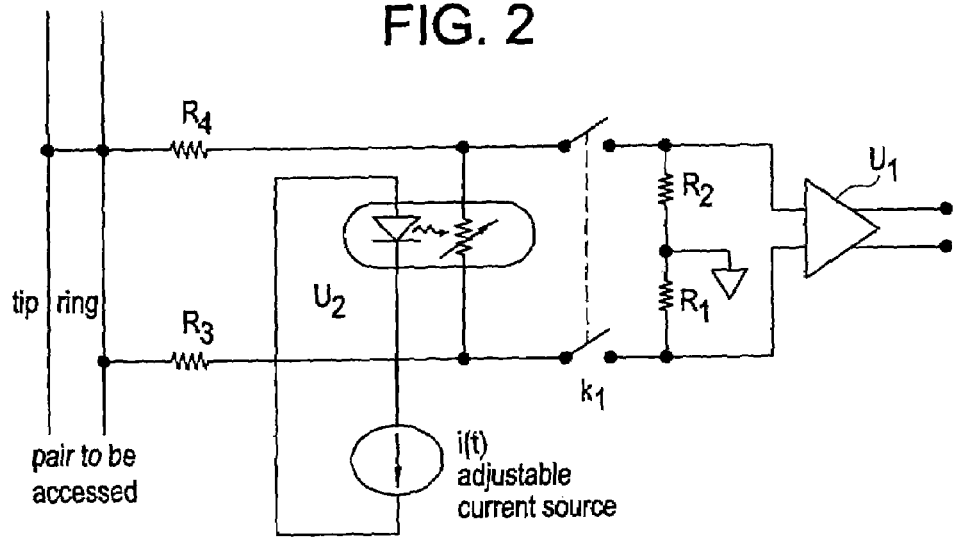
FIG. 2 is a schematic diagram showing elements of how the leads of a twisted pair to be accessed, are ultimately connected to an amplifier in a first embodiment of the present invention.

Thus, once selected by the selector 13 in FIG. 1, the variable elements 10 and switch 14, as further shown in FIG. 2, are operated in such a manner that the unavoidable load associated with the buffer 11, and possibly the wiring between the switch(es) 14 and buffer 13, are brought to bear on the subject telecommunications circuit at a rate gradual enough so that the modems or other terminal devices, in communication over the circuit, have an adequate time span over which to adapt to the changing conditions, without disruption. Of course, the ultimate loading imposed must still permit continuous operation after completion of adaptation. In other words, if the loading were a permanent feature of the telecommunications circuit, normal terminal device operation must be achievable.

The controller 15 contains the requisite information of the permissible loading application rate, dependent upon the ultimate load, and characteristics of the service operating on the subject telecommunications circuit, to avoid disruption of the communications.

The function of the buffer 11 is to provide isolation, once connected, of the selected telecommunications circuit, from any static or changing conditions associated with the monitor equipment 12.

FIG. 2 shows a schematic including elements of how the leads of a twisted pair of a DSL, which are to be accessed (for historic reasons, called the Tip and Ring), are ultimately connected to an amplifier U1. The details eliminated, and which should be familiar to one of ordinary skill in the art, are DC blocking, so that the monitor amplifier U1 is responsive to only the AC components present on the pair to be monitored, the method to produce the controlling current for the LED illuminating the photoresistor, overvoltage protection means, a multiple inductor used to improve high frequency common mode rejection (which yields insensitivity to equal voltages appearing on both the Tip and Ring leads of a pair, as opposed to differences in voltage between the Tip and Ring leads), and the gain selection parts associated with amplifier U1. Switching means to bring the one of thousands of possible twisted pairs to be monitored, to a substantially smaller multiplicity of circuit assemblies housing the GMA circuit, are also not shown in either FIG. 2 or FIG. 1 for better illustrative purposes.

Consider, initially the circuit of FIG. 2 with the photoresistor and controlling LED (U2) absent. There are several ways this easily controlled, large resistance swing, can be exploited to achieve the GMA of the present invention.

Standard switch or relay K1 serves to abruptly connect or disconnect the amplifier U1 to the accessed circuit. Also, while U1 itself has little loading effect, external resistors R1 and R2 are necessary to provide a bias current to the input pins of amplifier U1. The values of R1 and R2 are purposely selected to be small relative to R3 and R4 so as to provide a large division of what might otherwise be overloading levels of common mode voltage on the accessed pair. For example, the values of R1 and R2 could be 150 ohms each, and that of R3 and R4 could be 4.32 Kohms each. This same division also attenuates the desired tip and ring difference, or differential, voltages, and, as a result, amplifier U1 must provide compensating gain.

Under these conditions, when relay K1 is open, there is essentially an infinite resistance bridging the accessed pair, and thus no disruption to any type of data circuit. With relay K1 closed however, the bridging resistance is simply the sum of resistors R1, R2, R3, and R4, for example, 8.94 k ohms. The abrupt application or removal of this bridging impedance does not disrupt an otherwise properly functioning circuit using band splitting (i.e., no overlap between the send and receive frequency spectrum) techniques. Overlapping spectrum techniques such as SDSL, however, frequently experience severe disruption at both application and removal of even this unimposing bridging impedance.

The photoresistor is particularly well-suited for this application since it is relatively easy to obtain parts which possess resistance ratios in excess of ten thousand to one. For example, a typical photoresistor when dark (i.e., no LED current), exhibits a resistance in excess of $10^6$ ohms (1 megohm), and under strong illumination from the LED, its resistance falls below 100 ohms. Exploiting this widely variable resistance characteristic, allows the monitor apparatus to be applied or removed at an arbitrarily slow rate, thus permitting any continuously adaptive modem schemes to operate through the transitions without disruption.

Figure 3:
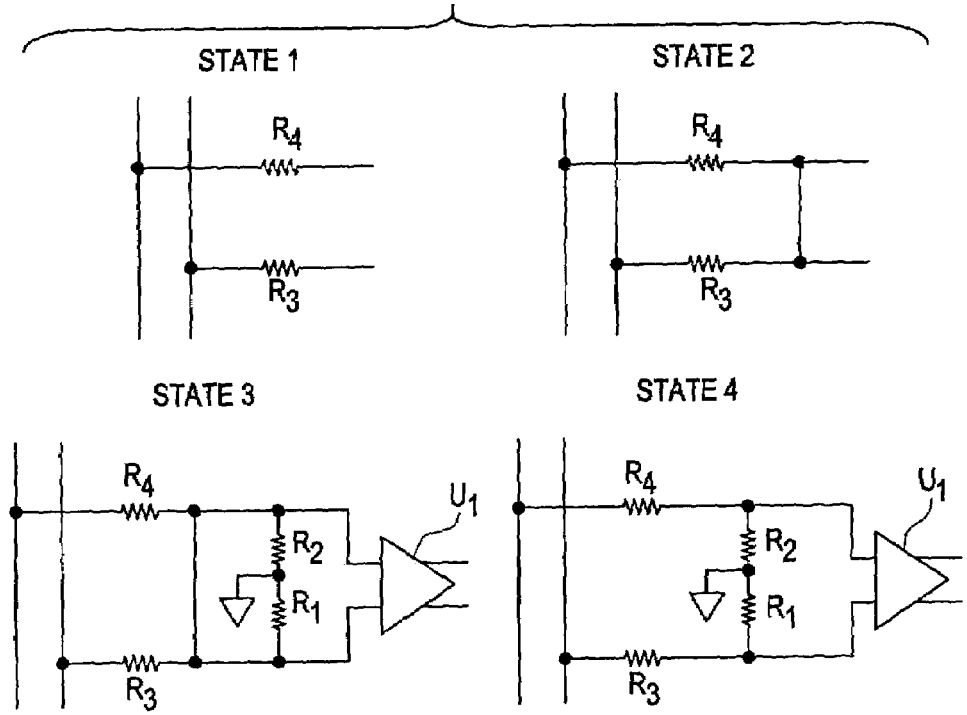
FIG. 3 illustrates the states transitioned between in the process of monitor application, and in the reverse order, the process of monitor removal, in the first embodiment of the present invention.

FIG. 3 illustrates the states of monitor application, and in the reverse order the removal of monitoring. At State 1, the photoresistor U2 is dark (i.e., high resistance state), and relay K1 (see FIG. 2) is open, resulting in no bridged loading of the selected circuit. State 2 is reached by gradually illuminating the photoresistor U2 until minimum resistance is obtained, which relative to the sum of the values of resistor R3 and resistor R4, is essentially a short. State 3 occurs when resistor K1 is closed. Note that with the short of the strongly illuminated photoresistor U2 in place, the closure of relay K1 has no effect on the bridging load presented to the data circuit. State 4 is reached by slowly removing the illumination of the photoresistor U2, until once again the influence of the photoresistor U2 disappears, leaving the monitor amplifier U1 connected, without disturbance, to the data circuit. Removal of the monitor U1 is accomplished in the reverse manner, slowly dropping the photoresistance to minimum, opening K1, and then slowly raising the photoresistance to maximum.

Figure 4:
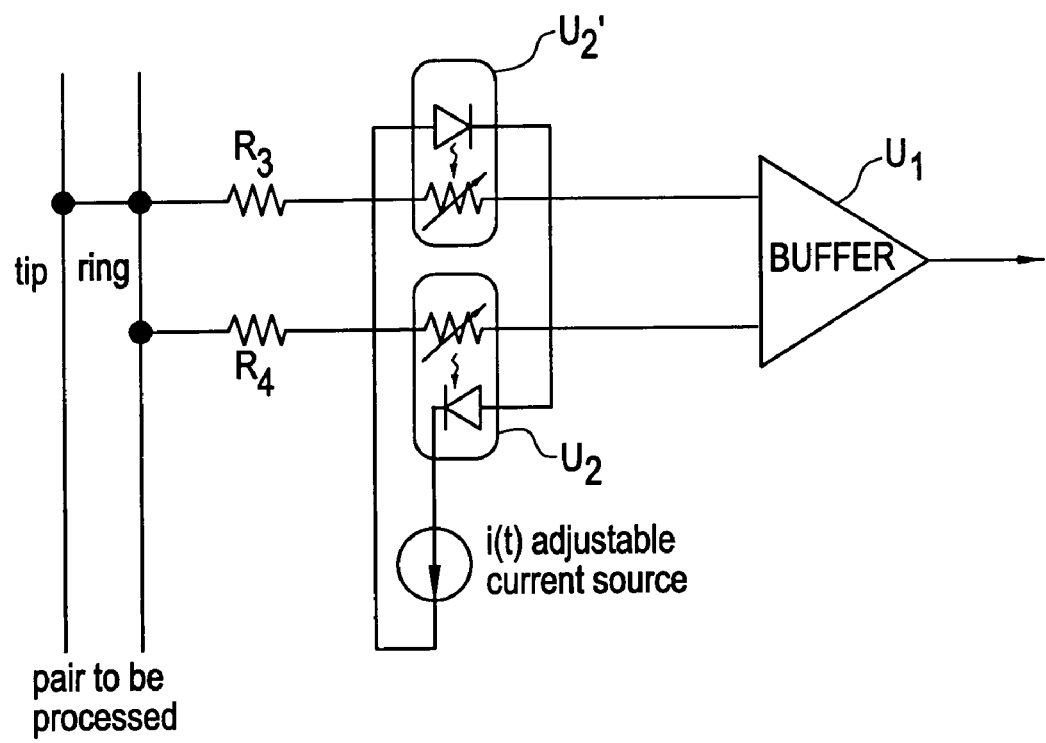
FIG. 4 illustrates a second embodiment of the present invention, where the effective coupling elements themselves are gradually varied between an open condition, and a minimum resistive value established by the fixed resistor values.

In a second embodiment of the present invention, as shown in FIG. 4, and throughout the remainder of the disclosure, like elements are described using like reference numerals.

As shown in FIG. 4, the variable element is two photoresistors providing variable coupling from the selected telecommunications circuit through two fixed resistors R3 and R4, which establish the absolute worst case circuit loading, to a buffer U1. As the photoresistors are slowly illuminated, the loading effect of the series combination of R3, R4, and the buffer input impedance, is correspondingly slowly applied to the telecommunications circuit without disruption. After this transition phase, monitor function is established. To remove the loading, and thus discontinue monitoring, the transition is reversed by slowly returning illumination of the photoresistors to zero, again without disruption of data flow over the circuit.

Although it is not principal to the operation of this second embodiment, it is advantageous to select R3 equal to R4, and to select U2 and U2' to have as closely equal transfer characteristics (i.e., resistance versus LED current) as possible, so that this GMA apparatus always imposes equal loading on the so-called Tip and Ring leads of the balanced two wire telecommunications circuit.

Imbalances imposed on such a two wire circuit degrade the crosstalk, and noise ingress immunity of that circuit, and even others bundled in close proximity to the subject circuit.

In a third embodiment of the present invention, slowly varied coupling mutual inductances are introduced into, and gradually applied coupling capacitances are introduced onto, the circuit to be monitored in an arrangement which forms a variable directional coupler with the circuit. The advantage of this arrangement is that not only can the monitor access, and thus the circuit loading, be slowly applied and removed, but when applied, the sampled telecommunications circuit energy can be separated according to the direction of incidence at the monitoring point in the circuit. In other words, even with overlapping spectrum modem schemes, communicating over a duplex path (i.e., the same path, in this case, pair, is used to simultaneously carry both directions of information flow), each direction can be separately observed. Demodulation of the individual information streams is even possible, if the initialization and training interval between the two communicating modems is observed.

If a conventional fixed directional coupler design were to be employed, it would be necessary to disruptively insert the coupler into the selected telecommunications circuit, or to avoid this effect, to provide on a one for one basis, a permanently installed coupler in each of potentially thousands of circuits of interest. This latter approach, although effective, would result in prohibitive costs per circuit, and prohibitive equipment volumes.

Therefore, the Applicant has determined that what is needed is a way to slowly apply and remove the coupling. One approach is to mechanically move the coupling transmission line section from a distance, to within close proximity of the data circuit pair to be examined. The implementation of this approach, is quite impractical at frequencies below roughly 1 Megahertz (i.e., wavelengths exceeding 200 meters in the twisted pair), within which all of the modems, considered thus far, operate. Another adaptation of the mechanical approach, which would be volumetrically feasible, but extremely intricate, would be to use a lumped element directional coupler with split inductive and capacitive elements.

Alternatively, an elegant approach is to use saturable transformer cores and electrically variable resistances in series with fixed value capacitive elements. Using these elements, the directional coupler is physically invariant, but initially in an electrically absent state, with the inductor cores saturated, and the variable resistance elements at maximum value. After connection to the twisted pair to be monitored, the coupler is slowly released to its operating state wherein there is no external saturating current applied to the inductive elements, and the variable resistance elements have reached a minimum value.

Thus, the photoresistors in series with the capacitive coupling elements are used to slowly apply the capacitive loading, and saturable inductors are used to slowly apply the necessary series coupling inductances, without the need for moving mechanical arrangements. The slowly varying element approach can also benefit in mitigating residual abrupt disturbances created by the circuit selection process prior to the gradual application of, and the deselection process after the gradual removal of, either the bridging monitor or variable directional coupler. Interestingly, referring to FIG. 1, it is possible to move the variable element GMA approach forward into the circuit selection functional block, at the expense of some extra complexity. As a result, a monitor or directional coupler of fixed design (i.e., without any directly associated controllable variable elements), could be used without creating disruptions to a circuit operating with modems capable of adapting at least slowly to changes in the transmission path parameters.

More specifically, a common inductance is required between the circuit to be monitored, and the sampling circuit when implementing a lumped directional coupler. Generally, this inductance is achieved by passing a lead of the sampled circuit, and a lead from the sampling circuit, through a common core of magnetic material. If an inductance so formed were present when the circuit of interest was switched to a common directional coupler, the disruptions would be intolerable.

Materials used to construct such a magnetic core, cannot contain arbitrarily large levels of magnetic flux, and will eventually saturate, with the apparent electrical effect of reduced incremental inductance. Advantageously, this limitation can be exploited to form a variable inductance. In a third embodiment of the present invention, as shown in FIG. 5, for example, by adding a third wire or tertiary winding 25 to the core 26, and passing DC current of a controllable amount through it from a DC current source 27, the imposed inductance on the sampled transmission line can be gradually adjusted from near zero (i.e., large DC current), to the required value proper directional coupler operation (i.e., zero DC current).

Figure 5:
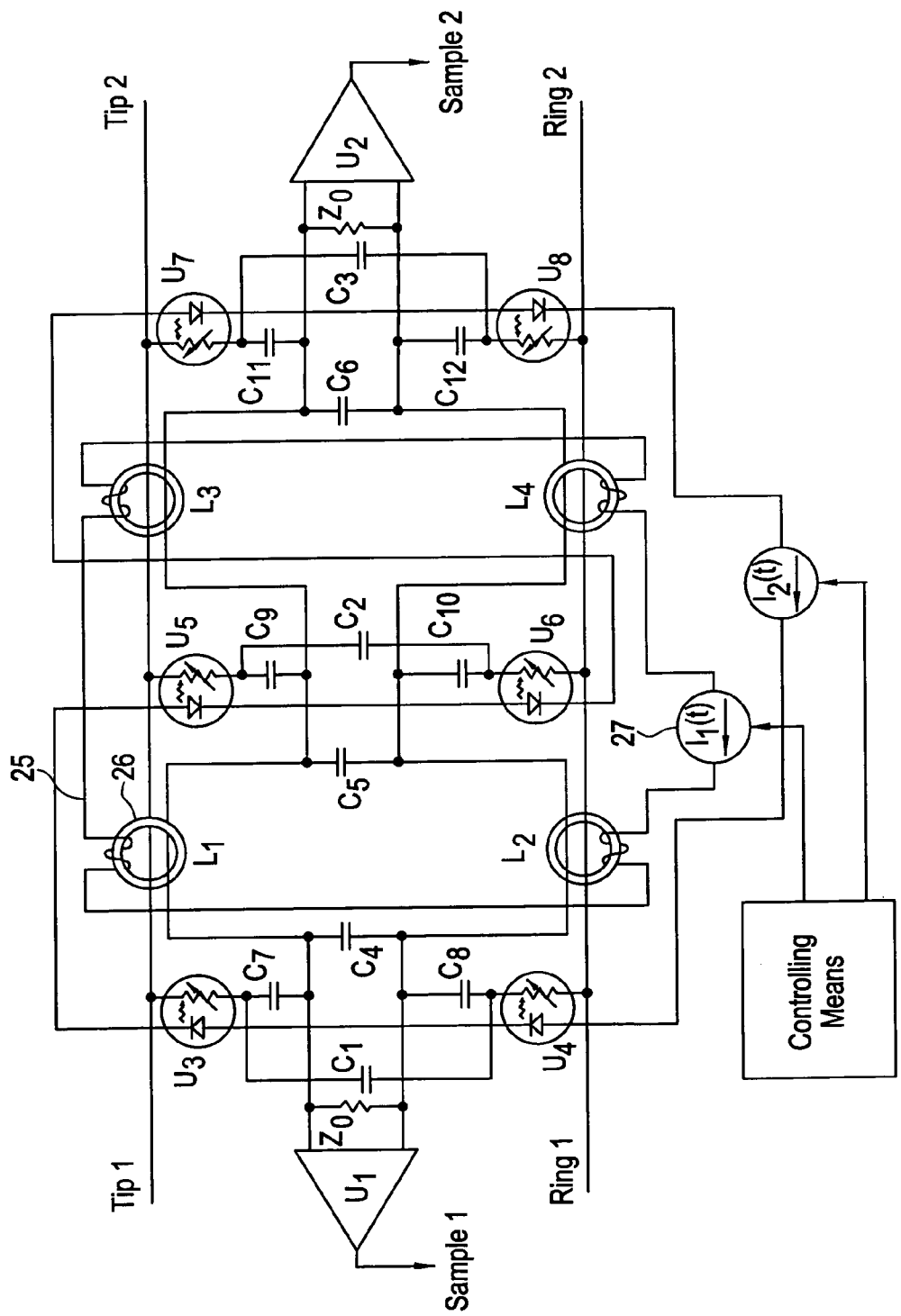
FIG. 5 illustrates a third embodiment of the present invention where a lumped equivalent directional coupler is gradually applied or removed, electrically, from the circuit to be monitored.
Figure 6:
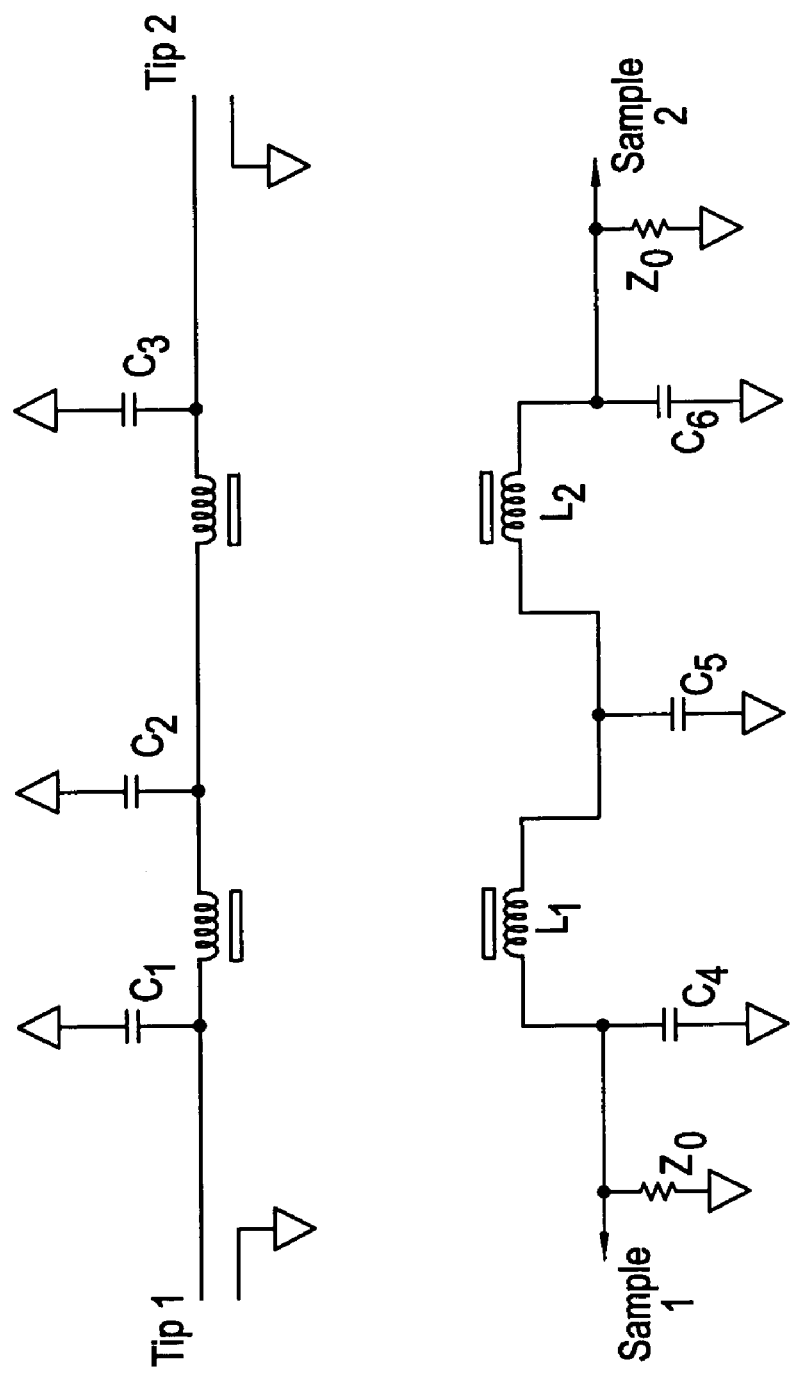
FIG. 6 illustrates a pair of uncoupled, unbalanced, five pole, lumped equivalent transmission lines, as taken from FIG. 5.

In order to clarify how this works in detail, FIG. 5 is developed in increments starting with FIG. 6, which illustrates two uncoupled, unbalanced (one side each of the "in" and "out" connections is ground), five (5) pole (in the illustrated type of circuit construction, the number of mathematical response poles equals the number of effective reactive elements), lumped equivalent transmission lines. The number of poles necessary is determined by the ratio of the highest to the lowest frequency of interest, and the accuracy to which a specific coupling ratio must be maintained over that frequency range.

Again, in FIG. 5, like reference numerals denote like elements, with U1 and U2 denoting the buffers, and U3–U8 denoting the variable photoresistors. C1–C12 denote capacitors, L1–L4 are impedance elements, and I1(t) and I2(t) the current sources.

Figure 7:
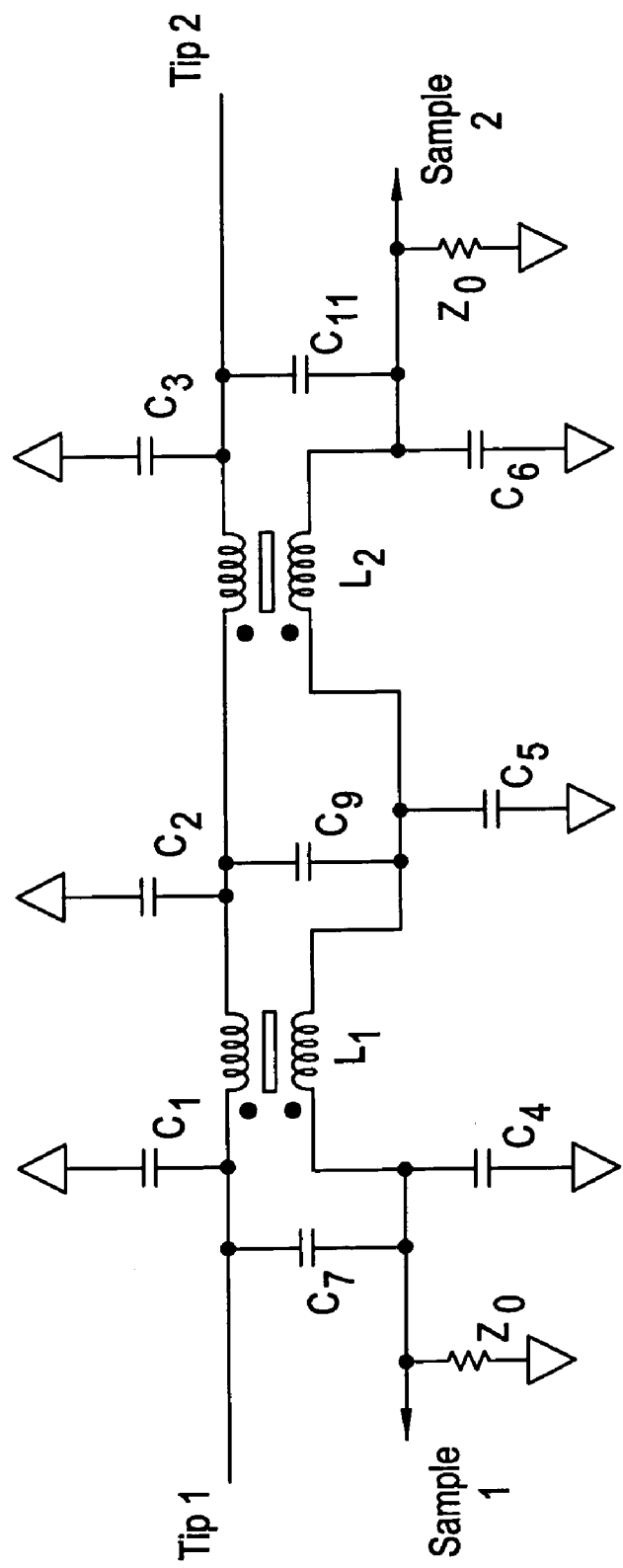
FIG. 7 illustrates the independent lumped equivalent line sections of FIG. 6, permanently coupled by mutual inductances, and adding coupling capacitors, thus forming the fixed directional coupler, as taken from FIG. 5.

FIG. 7 illustrates the previously independent lumped equivalent line sections permanently coupled by mutual inductances in L1 and L2, and added coupling capacitors C7, C9, and C11, thus forming a fixed directional coupler. If the characteristic impedance (typically referred to as $Z_o$) of the lumped equivalent sampling transmission line is selected as terminations at both ends of the sampling transmission line, within the chosen frequency band of operation, separation of energy arriving from either direction toward the coupler, is possible. By proper selection of the mutual inductances and capacitances, a small percentage of the energy arriving at tip 1 appears at sample 1, and ideally, no related response is seen at sample 2. Conversely, a small percentage of the energy arriving at tip 2 is diverted to sample 2, with compartively minimal influence of sample 1. The sample derived from each direction can then be monitored and analyzed.

Figure 8:
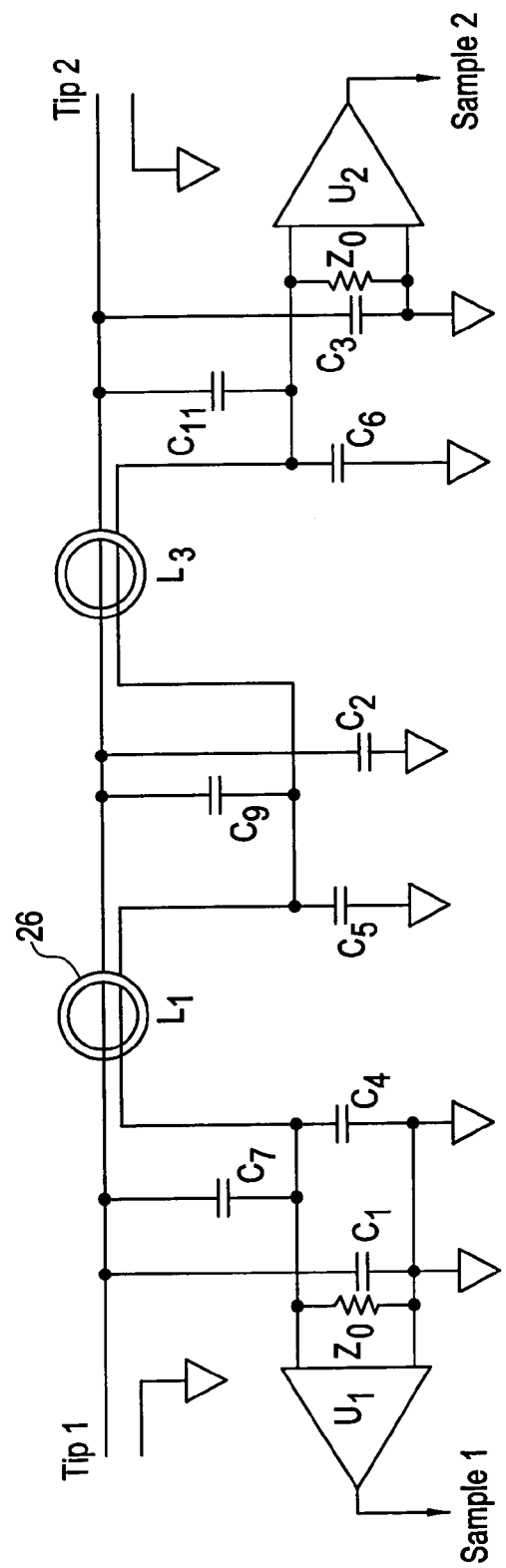
FIG. 8 illustrates the addition of buffers to the fixed directional coupler of FIG. 7, as taken from FIG. 5.

FIG. 8 illustrates the addition of buffers U1 and U2, and a more physical representation of L1 and L2.

Figure 9:
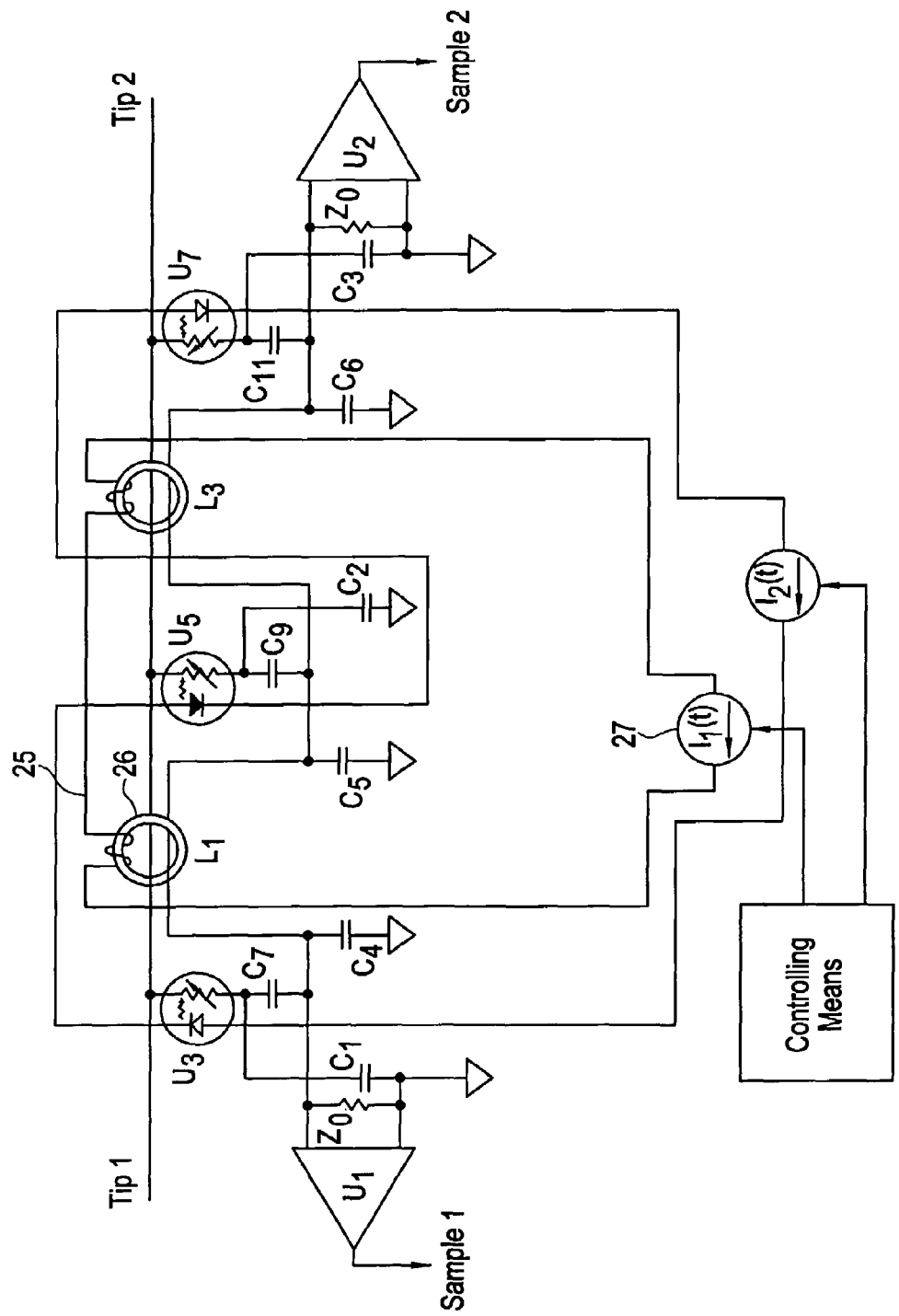
FIG. 9 illustrates the fixed directional coupler of FIG. 8, with the addition of variable coupling elements, actuating current sources, and controlling means, as taken from FIG. 5.

FIG. 9 adds the components necessary to gradually introduce, or remove, the electrical presence of the directional coupler. The controlled current source $I1_{(t)}$ is shown, to saturate the cores of L1 and L2, thus removing the inductive coupling between the sampled and sampling networks. Similarly, $I2_{(t)}$ is added to control the illumination, and thus the value of photoresistors U3, U5, and U7, which may be controlled between ohms and megohms. Under strong illumination, the photoresistance is substantially on, or shorted, effectively inserting mutual coupling capacitors C7, C9, and C11. Under no illumination, U3, U5, and U7, display very high resistances, thus removing the effect of mutual coupling elements C7, C9, and C11.

Finally, FIG. 5 is an amalgamation of a mirror image of the coupled networks of FIG. 6, with the networks of FIG. 6 themselves, so that the variable directional coupler can be utilized in balanced media, such as a twisted pair. The controlled current sources simply operate both the tip and ring networks simultaneously.

Accordingly, from the above, a gradual application of a monitoring access to a DSL circuit without disrupting ongoing transmissions can be performed, using the present GMA technique, as shown in FIG. 5. The process is reversed to remove the monitor access.

Thus, as noted above, these are just three examples of using the GMA technique to monitor a communications circuit without data disruption.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of applying and disconnecting an unavoidable load to a communications circuit, the method comprising the steps of:
   gradually one of applying and disconnecting the unavoidable load to the communications circuit without data disruption,
   wherein said unavoidable load is presented by a monitor access, and said applying step comprises:
      gradually applying a variable impedance element to the communications circuit;
      connecting said monitor to the communications circuit; and
      gradually removing said variable impedance element from the communications circuit such that said monitor is connected to the communications circuit without data disruption.

2. The method according to claim 1, wherein said disconnecting step comprises:
   gradually applying said variable impedance element to the communications circuit;

disconnecting said monitor from said communications circuit; and gradually removing said variable impedance element from the communications circuit such that said monitor is disconnected from the communications circuit without data disruption.

3. The method according to claim 1 or 2, wherein said variable impedance element includes at least one of a variable resistance element, a variable inductance element, a variable capacitance element, a variable mutual coupling transformer, and a variable mutual coupling distributed element.

4. The method according to claim 3, wherein said variable impedance element is variable photoresistor, and the applying step comprises:

opening a relay which connects said monitor access to the communications circuit, such that no bridging loading of the circuit is presented;

gradually illuminating said variable photoresistor and applying a bridged load on the communications circuit, said load reaching a maximum when a minimum photoresistance is obtained, said minimum photoresistance approximating a short;

closing the relay, such that no effect on the bridged load is presented to the circuit due to said illuminated variable photoresistor having reached said minimum photoresistance, and connecting the monitor access to the communications circuit;

removing gradually the illumination of said photoresistor such that the monitor access is completed to the circuit without disturbance, as the photoresistance reaches a maximum value in the absence of illumination.

5. The method according to claim 4, wherein the disconnecting step comprises:

gradually illuminating the variable photoresistor and applying a bridged load on the communications circuit, said load reaching a maximum when said minimum photoresistance is obtained, said minimum photoresistance approximating a short;

opening the relay, such that there is no effect on the bridged load that is presented to the circuit due to said illuminated variable photoresistor having reached said minimum photoresistance, and disconnecting the monitor access from the communications circuit; and removing gradually the illumination of the photoresistor until the monitor access is removed from the circuit without disturbance, as the photoresistance reaches a maximum value in the absence of illumination.

6. The method according to claim 2, further comprising controlling the impedance versus time, of the variable impedance element.

7. The method of claim 1, wherein each direction of information flow in the communications circuit can be separately observed.

8. The method of claim 1, wherein the communications circuit comprises a digital subscriber loop (DSL).

9. The method of claim 1, wherein the communication circuit comprises at least one of a fiber optic data circuit, a wireline data circuit, and a waveguide data circuit.

10. The method of claim 9, wherein the wireline data circuit comprises at least a digital subscriber loop, a duplex transmission scheme, and modem means continuously adaptive to slow transmission media parametric changes.

11. An apparatus for applying and removing a monitor access to a communications circuit, comprising:

a variable photoresistor illuminated by a controllable light source;

a relay connected to said photoresistor;

a monitor amplifier connected to said relay;

wherein when said variable photoresistor is gradually illuminated and imposes a predetermined load on the communications circuit, said relay can be operated to connect said monitor amplifier to the communications circuit without data disruption.

12. An apparatus for applying and removing a monitor access to a communications circuit, comprising:

a pair of variable photoresistors;

a pair of resistors coupled to said pair of photoresistors;

a monitor amplifier connected to said photoresistors and said circuit;

wherein when said variable photoresistors are gradually illuminated, said resistors in conjunction with said monitor amplifier impose a bridging load on the circuit, such that said monitor amplifier can be connected to said communications circuit without data disruption.

* * * * *